US009916719B2

(12) United States Patent
Hawkins et al.

(10) Patent No.: US 9,916,719 B2
(45) Date of Patent: Mar. 13, 2018

(54) METHOD OF GAMING, A GAMING SYSTEM AND A GAME CONTROLLER

(71) Applicant: Aristocrat Technologies Australia Pty Limited, North Ryde (AU)

(72) Inventors: Ryan Paul Hawkins, Henderson, NV (US); Yanis Tsombanidis, Las Vegas, NV (US)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 228 days.

(21) Appl. No.: 14/866,051

(22) Filed: Sep. 25, 2015

(65) Prior Publication Data

US 2016/0093148 A1 Mar. 31, 2016

(30) Foreign Application Priority Data

Sep. 26, 2014 (AU) ................................ 2014903841

(51) Int. Cl.
*A63F 13/00* (2014.01)
*G07F 17/32* (2006.01)

(52) U.S. Cl.
CPC ...... *G07F 17/3213* (2013.01); *G07F 17/3227* (2013.01)

(58) Field of Classification Search
CPC ......................... G07F 17/3213; G07F 17/3227
USPC ............................................................ 463/20
See application file for complete search history.

(56) References Cited

U.S. PATENT DOCUMENTS

2009/0186686 A1* 7/2009 Shai-Hee ............ G07F 17/3265 463/20
2013/0102375 A1* 4/2013 Aoki ....................... G07F 17/32 463/20
2013/0324213 A1* 12/2013 Aoki ..................... G07F 17/326 463/20
2014/0274288 A1* 9/2014 Hornik .................. G07F 17/326 463/20

* cited by examiner

*Primary Examiner* — Allen Chan
(74) *Attorney, Agent, or Firm* — McAndrews, Held & Malloy, Ltd.

(57) ABSTRACT

An electronic method of gaming comprising, displaying a symbol evaluation area on a display of a gaming system, the symbol evaluation area comprising a plurality of rows and a plurality of columns of symbol display positions; generating a game outcome by selecting a plurality of symbols to populate the symbol display area, the symbols being selected from first symbols having a size corresponding to the size of the symbol display positions and one or more second symbols, wherein each second symbol is at least the size of two display positions, the selecting of the symbols including selecting a display position of the evaluation area at which each selected first symbol will be displayed, and selecting one or more symbol display positions of the evaluation area at which part of each selected second symbol will be displayed.

20 Claims, 9 Drawing Sheets

METHOD OF GAMING, A GAMING SYSTEM AND A GAME CONTROLLER

RELATED APPLICATIONS

This application claims priority to Australia Provisional Patent Application No. 2014903841 having an International filing date of Sep. 26, 2014, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In electronic gaming systems such as spinning reel or "slot" gaming machines, symbols are selected for display on a display of the machine. The displayed symbols are evaluated to determine whether an award is to be made to a player.

While such gaming systems provide players with enjoyment, a need exists for alternative gaming systems in order to maintain or increase player enjoyment.

BRIEF SUMMARY OF THE INVENTION

In a first aspect, the invention provides an electronic method of operating a gaming system comprising a display and a game controller, the method comprising:

displaying a symbol evaluation area on a display of a gaming system, the symbol evaluation area comprising a plurality of rows and a plurality of columns of symbol display positions;

generating, using the game controller, a game outcome by selecting a plurality of symbols to populate the symbol display area, the symbols being selected from first symbols having a size corresponding to the size of the symbol display positions and one or more second symbols, wherein each second symbol is at least the size of two display positions, the selecting of the symbols including selecting a display position of the evaluation area at which each selected first symbol will be displayed, and selecting one or more symbol display positions of the evaluation area at which part of each selected second symbol will be displayed such that depending on one or more symbol display positions selected for a respective second symbol, only a part of the respective selected second symbol may be within the symbol evaluation area;

upon only part of one or more selected second symbols being within the symbol evaluation area, expanding, using the game controller, the symbol evaluation area displayed on the display of the gaming system by adding one or more rows of symbol display positions, one or more columns of symbol display positions, or one or more rows and one or more columns of symbol display positions so that all of each selected second symbol is within the expanded symbol evaluation area; and generating, using the game controller, a modified game outcome including symbols at each symbol display position of the expanded symbol evaluation area.

In an embodiment, the method comprises further expanding the symbol evaluation area using the game controller upon only part of one or more second symbols included in the modified game outcome being within the expanded symbol evaluation area, and generating a further modified game outcome including symbols at each symbol display position within the further expanded symbol evaluation area.

In an embodiment, the method comprises evaluating at least one of the game outcome and the modified game outcome to determine whether to make an award.

In an embodiment, the method comprises displaying any portion of a second symbol extending outside the symbol evaluation area on the display of the gaming system.

In an embodiment, generating the modified game outcome comprises retaining, using the game controller, each second symbol and selecting new symbols for remaining symbol display positions of the symbol evaluation area.

In an embodiment, modifying the game outcome comprises selecting symbols for each additional symbol display position added to the symbol evaluation area in response to expansion of the symbol display area.

In an embodiment, the method comprises generating an initial game outcome by selecting a plurality of symbols from a symbol set comprising only first symbols having a size corresponding to the size of the symbol display positions, and upon at least one trigger condition being met replacing the initial game outcome with the game outcome generated by selecting a plurality of symbols from a symbol set comprising first symbols having a size corresponding to the size of the symbol display positions and one or more second symbols, wherein each second symbol is at least the size of two display positions.

In an embodiment, at least one trigger condition includes that the initial game outcome is a losing game outcome.

In an embodiment, the at least one trigger condition includes that a random determination meets a defined criterion.

In an embodiment, the initial game outcome is not displayed upon the at least one trigger condition being met.

In an embodiment, the initial game outcome is displayed upon the at least one trigger condition not being met.

In an embodiment, the first symbols belong to respective ones a plurality of reels of symbols each corresponding to a column of the symbol evaluation area, and selecting the symbols includes determining a stop position for each of the reels.

In an embodiment, each second symbol belongs to a respective one of the plurality of reels.

In an embodiment, each second symbol is added to a respective one of the plurality of reels.

In an embodiment, each second symbol belongs to an overlay reel, a stopping position for each overlay reel is selected independently of the stopping positions of each reel having first symbols, and when a stopping position of an overlay reel results in at least part of a second symbol being displayed within the symbol evaluation area, the at least part of the second symbol replaces each first symbol at the symbol display position or positions where the second symbol is displayed.

In a second aspect, the invention provides an electronic method of operating a gaming system comprising a display, a game controller, and a memory storing a plurality of reel strips of respective ones of a plurality of reels, at least one of the reel strips comprising at least one oversized symbol that is large enough to occupy two or more symbol display positions of a column of symbol display positions whereby in certain stopping positions of the respective reel strip only part of the oversized symbol will be displayed, the method comprising:

selecting, using the game controller, symbols for a first evaluation area of symbol display positions comprising a plurality of columns of symbol display positions set side by side by selecting first stopping positions for each of the reel strips;

displaying the selected symbols in the first evaluation area of symbol display positions;

upon the displayed symbols including only part of one or more oversized symbols, forming a second, expanded evaluation area of symbol display positions by adding sufficient rows of symbol display positions to the first evaluation area to accommodate all of each of the oversized symbols;

selecting symbols for the second evaluation area by selecting second stopping positions for each of the reel strips; and making an award in response to the symbols selected for the second evaluation area corresponding to one or more winning outcomes.

In an embodiment, the method comprises retaining, using the game controller, each oversized symbol selected for the first evaluation area at the symbol display positions the respective oversized symbol occupies in the second evaluation area when symbols are selected for the second evaluation area.

In an embodiment, the method comprises upon the displayed symbols of the second evaluation area including only part of one or more further oversized symbols, forming, using the game controller, a third evaluation area of symbol display positions by adding sufficient rows of symbol display positions to the second evaluation area to accommodate all of each of the oversized symbols.

In an embodiment, the method comprises selecting, using the game controller, a further set of symbols each time part or all of an oversized symbol is selected.

In a third aspect, the invention provides a game controller for an electronic gaming system, the game controller comprising:

a display controller configured to controlling a display of a gaming system to display a symbol evaluation area on a, the symbol evaluation area comprising a plurality of rows and a plurality of columns of symbol display positions;

an outcome generator configured to generate a game outcome by selecting a plurality of symbols to populate the symbol display area, the symbols being selected from first symbols having a size corresponding to the size of the symbol display positions and one or more second symbols, wherein each second symbol is at least the size of two display positions, the selecting of the symbols including selecting a display position of the evaluation area at which each selected first symbol will be displayed, and selecting one or more symbol display positions of the evaluation area at which part of each selected second symbol will be displayed such that depending on the symbol display positions selected for a respective second symbol, only a part of the respective selected second symbol may be within the symbol evaluation area; and an evaluation area expander, configured to, upon only part of one or more selected second symbols being within the symbol evaluation area, cause an expansion of the symbol evaluation area displayed on the display of the gaming system by adding one or more rows of symbol display positions, one or more columns of symbol display positions, or one or more rows and one or more columns of symbol display positions so that all of each selected second symbol is within the expanded symbol evaluation area, wherein the outcome generator is configured to modify the game outcome to include symbols at each symbol display position of the expanded symbol evaluation area. 21. A game controller as claimed in claim 20, wherein the evaluation area expander is arranged to further expand the symbol evaluation area upon only part of one or more second symbols included in the modified game outcome being within the expanded symbol evaluation area, and the outcome generator is arranged to generate a further modified game outcome including symbols at each symbol display position within the further expanded symbol evaluation area.

In an embodiment, the game controller comprises an outcome evaluator arranged to evaluate at least one of the game outcome and the modified game outcome to determine whether to make an award.

In an embodiment, the display controller is arranged to control the display to display any portion of a second symbol extending outside the symbol evaluation area on the display of the gaming system.

In an embodiment, when the outcome generator generates the modified game outcome, the outcome generator retains each second symbol and selects new symbols for remaining symbol display positions of the symbol evaluation area.

In an embodiment, when the outcome generator generates the modified game outcome, the outcome generator selects symbols for each additional symbol display position added to the symbol evaluation area in response to expansion of the symbol display area.

In an embodiment, the outcome generator is arranged to generate an initial game outcome by selecting a plurality of symbols from a symbol set comprising only first symbols having a size corresponding to the size of the symbol display positions, and upon at least one trigger condition being met the game controller replaces the initial game outcome with the game outcome generated by selecting a plurality of symbols from a symbol set comprising first symbols having a size corresponding to the size of the symbol display positions and one or more second symbols, wherein each second symbol is at least the size of two display positions.

In an embodiment, at least one trigger condition includes that the initial game outcome is a losing game outcome.

In an embodiment, the at least one trigger condition includes that a random determination meets a defined criterion.

In an embodiment, the initial game outcome is not displayed upon the at least one trigger condition being met.

In an embodiment, the initial game outcome is displayed upon the at least one trigger condition not being met.

In an embodiment, the first symbols belong to respective ones a plurality of reels of symbols each corresponding to a column of the symbol evaluation area, and selecting the symbols includes determining a stop position for each of the reels.

In an embodiment, each second symbol belongs to a respective one of the plurality of reels.

In an embodiment, each second symbol is added to a respective one of the plurality of reels.

In an embodiment, each second symbol belongs to an overlay reel, a stopping position for each overlay reel is selected independently of the stopping positions of each reel having first symbols, and when a stopping position of an overlay reel results in at least part of a second symbol being displayed within the symbol evaluation area, the at least part of the second symbol replaces each first symbol at the symbol display position or positions where the second symbol is displayed.

In a fourth aspect, the invention provides a game controller for a gaming system comprising a display and a memory storing a plurality of reel strips of respective ones of a plurality of reels, at least one of the reel strips comprising at least one oversized symbol that is large enough to occupy two or more symbol display positions of a column of symbol display positions whereby in certain stopping positions of the respective reel strip only part of the oversized symbol will be displayed, the game controller comprising:

a symbol selector arranged to select symbols for a first evaluation area of symbol display positions comprising a plurality of columns of symbol display positions set side by side by selecting first stopping positions for each of the reel strips;

a display controller arranged to display the selected symbols in the first evaluation area of symbol display positions; and an evaluation array expander arranged to, upon the displayed symbols including only part of one or more oversized symbols, form a second evaluation area of symbol display positions by adding sufficient rows of symbol display positions to the first evaluation area to accommodate all of each of the oversized symbols, wherein the symbol selector is also arranged select symbols for the second evaluation area by selecting second stopping positions for each of the reel strips, and the game controller further comprises an outcome evaluator arranged, make an award in response to the symbols selected for the second evaluation area corresponding to one or more winning outcomes.

In an embodiment, the outcome evaluator is arranged to retain each oversized symbol selected for the first evaluation area at the symbol display positions the respective oversized symbol occupies in the second evaluation area when symbols are selected for the second evaluation area.

In an embodiment, the evaluation area expander is arranged to, upon the displayed symbols of the second evaluation area including only part of one or more further oversized symbols, form a third evaluation area of symbol display positions by adding sufficient rows of symbol display positions to the second evaluation area to accommodate all of each of the oversized symbols.

In an embodiment, the symbol selector is arranged to select a further set of symbols each time part or all of an oversized symbol is selected.

In a fifth aspect, the invention provides a gaming system comprising:

a display; and a game controller configured to:

control the display to display a symbol evaluation area, the symbol evaluation area comprising a plurality of rows and a plurality of columns of symbol display positions;

generate a game outcome by selecting a plurality of symbols to populate the symbol display area, the symbols being selected from first symbols having a size corresponding to the size of the symbol display positions and one or more second symbols, wherein each second symbol is at least the size of two display positions, the selecting of the symbols including selecting a display position of the evaluation area at which each selected first symbol will be displayed, and selecting one or more symbol display positions of the evaluation area at which part of each selected second symbol will be displayed such that depending on the one or more symbol display positions selected for a respective second symbol, only a part of the respective selected second symbol may be within the symbol evaluation area;

upon only part of one or more selected second symbols being within the symbol evaluation area, expand the symbol evaluation area displayed on the display by adding one or more rows of symbol display positions, one or more columns of symbol display positions, or one or more rows and one or more columns of symbol display positions so that all of each selected second symbol is within the expanded symbol evaluation area; and generate a modified game outcome including symbols at each symbol display position of the expanded symbol evaluation area.

In a sixth aspect, the invention provides a gaming system comprising a display and a memory storing a plurality of reel strips of respective ones of a plurality of reels, at least one of the reel strips comprising at least one oversized symbol that is large enough to occupy two or more symbol display positions of a column of symbol display positions whereby in certain stopping positions of the respective reel strip only part of the oversized symbol will be displayed, the game controller arranged to:

select symbols for a first evaluation area of symbol display positions comprising a plurality of columns of symbol display positions set side by side by selecting first stopping positions for each of the reel strips;

control the display to display the selected symbols in the first evaluation area of symbol display positions;

upon the displayed symbols including only part of one or more oversized symbols, forming a second, expanded evaluation area of symbol display positions by adding sufficient rows of symbol display positions to the first evaluation area to accommodate all of each of the oversized symbols;

select symbols for the second evaluation area by selecting second stopping positions for each of the reel strips; and make an award in response to the symbols selected for the second evaluation area corresponding to one or more winning outcomes.

In a seventh aspect, the invention provides computer program code which when executed implements the above method.

In an eighth aspect, the invention provides a tangible computer readable medium comprising the above program code.

In yet another aspect, the invention provides a game controller for an electronic gaming system. The game controller comprises a display controller configured to control a display of a gaming system to display a symbol evaluation area, the symbol evaluation area comprising a plurality of rows and a plurality of columns of symbol display positions; an outcome generator configured to generate a game outcome by selecting a plurality of symbols to populate the symbol display area, the symbols being selected from first symbols having a size corresponding to the size of the symbol display positions and one or more second symbols, wherein each second symbol is at least the size of two display positions, the selecting of the symbols including selecting a display position of the evaluation area at which each selected first symbol will be displayed, and selecting one or more symbol display positions of the evaluation area at which part of each selected second symbol will be displayed such that depending on the symbol display positions selected for a respective second symbol, only a part of the respective selected second symbol may be within the symbol evaluation area; and an evaluation area expander, configured to, upon only part of one or more selected second symbols being within the symbol evaluation area, cause an expansion of the symbol evaluation area displayed on the display of the gaming system by adding one or more rows of symbol display positions, one or more columns of symbol display positions, or one or more rows and one or more columns of symbol display positions so that all of each selected second symbol is within the expanded symbol evaluation area, wherein the outcome generator is configured to generate a modified game outcome including symbols at each symbol display position of the expanded symbol evaluation area.

The evaluation area expander may be arranged to further expand the symbol evaluation area upon only part of one or more second symbols included in the modified game outcome being within the expanded symbol evaluation area, and the outcome generator is arranged to generate a further modified game outcome including symbols at each symbol display position within the further expanded symbol evaluation area.

The game controller may also comprise an outcome evaluator arranged to evaluate at least one of the game outcome and the modified game outcome to determine whether to make an award.

The display controller may be arranged to control the display to display any portion of a second symbol extending outside the symbol evaluation area on the display of the gaming system.

When the outcome generator generates the modified game outcome, the outcome generator retains each second symbol and selects new symbols for remaining symbol display positions of the symbol evaluation area.

When the outcome generator generates the modified game outcome, the outcome generator selects symbols for each additional symbol display position added to the symbol evaluation area in response to expansion of the symbol display area.

The outcome generator may be arranged to generate an initial game outcome by selecting a plurality of symbols from a symbol set comprising only first symbols having a size corresponding to the size of the symbol display positions, and upon at least one trigger condition being met the game controller replaces the initial game outcome with the game outcome generated by selecting a plurality of symbols from a symbol set comprising first symbols having a size corresponding to the size of the symbol display positions and one or more second symbols, wherein each second symbol is at least the size of two display positions.

At least one trigger condition includes that the initial game outcome is a losing game outcome.

The at least one trigger condition includes that a random determination meets a defined criterion.

The initial game outcome may not be displayed upon the at least one trigger condition being met.

The initial game outcome may be displayed upon the at least one trigger condition not being met.

The first symbols may belong to respective ones a plurality of reels of symbols each corresponding to a column of the symbol evaluation area, and selecting the symbols includes determining a stop position for each of the reels.

Each second symbol may belong to a respective one of the plurality of reels.

Each second symbol may be added to a respective one of the plurality of reels.

Each second symbol may belong to an overlay reel, a stopping position for each overlay reel is selected independently of the stopping positions of each reel having first symbols, and when a stopping position of an overlay reel results in at least part of a second symbol being displayed within the symbol evaluation area, the at least part of the second symbol replaces each first symbol at the symbol display position or positions where the second symbol is displayed.

In still another aspect, the invention provides a game controller for a gaming system comprising a display and a memory storing a plurality of reel strips of respective ones of a plurality of reels, at least one of the reel strips comprising at least one oversized symbol that is large enough to occupy two or more symbol display positions of a column of symbol display positions whereby in certain stopping positions of the respective reel strip only part of the oversized symbol will be displayed. The game controller comprises a symbol selector arranged to select symbols for a first evaluation area of symbol display positions comprising a plurality of columns of symbol display positions set side by side by selecting first stopping positions for each of the reel strips; a display controller arranged to display the selected symbols in the first evaluation area of symbol display positions; and an evaluation array expander arranged to, upon the displayed symbols including only part of one or more oversized symbols, form a second evaluation area of symbol display positions by adding sufficient rows of symbol display positions to the first evaluation area to accommodate all of each of the oversized symbols, wherein the symbol selector is also arranged select symbols for the second evaluation area by selecting second stopping positions for each of the reel strips, and the game controller further comprises an outcome evaluator arranged, make an award in response to the symbols selected for the second evaluation area corresponding to one or more winning outcomes.

The outcome evaluator may be arranged to retain each oversized symbol selected for the first evaluation area at the symbol display positions the respective oversized symbol occupies in the second evaluation area when symbols are selected for the second evaluation area.

The evaluation area expander may be arranged to, upon the displayed symbols of the second evaluation area including only part of one or more further oversized symbols, form a third evaluation area of symbol display positions by adding sufficient rows of symbol display positions to the second evaluation area to accommodate all of each of the oversized symbols.

The symbol selector is arranged to select a further set of symbols each time part or all of an oversized symbol is selected.

In still another aspect, the invention provides a gaming system comprising a display and a memory storing a plurality of reel strips of respective ones of a plurality of reels, at least one of the reel strips comprising at least one oversized symbol that is large enough to occupy two or more symbol display positions of a column of symbol display positions whereby in certain stopping positions of the respective reel strip only part of the oversized symbol will be displayed, the game controller arranged to: select symbols for a first evaluation area of symbol display positions comprising a plurality of columns of symbol display positions set side by side by selecting first stopping positions for each of the reel strips; control the display to display the selected symbols in the first evaluation area of symbol display positions; upon the displayed symbols including only part of one or more oversized symbols, forming a second, expanded evaluation area of symbol display positions by adding sufficient rows of symbol display positions to the first evaluation area to accommodate all of each of the oversized symbols; select symbols for the second evaluation area by selecting second stopping positions for each of the reel strips; and make an award in response to the symbols selected for the second evaluation area corresponding to one or more winning outcomes.

BRIEF DESCRIPTION OF SEVERAL VIEWS OF THE DRAWINGS

Embodiments of the invention will now be described with reference to the accompanying drawings in which.

DETAILED DESCRIPTION OF THE INVENTION

Figure 1:
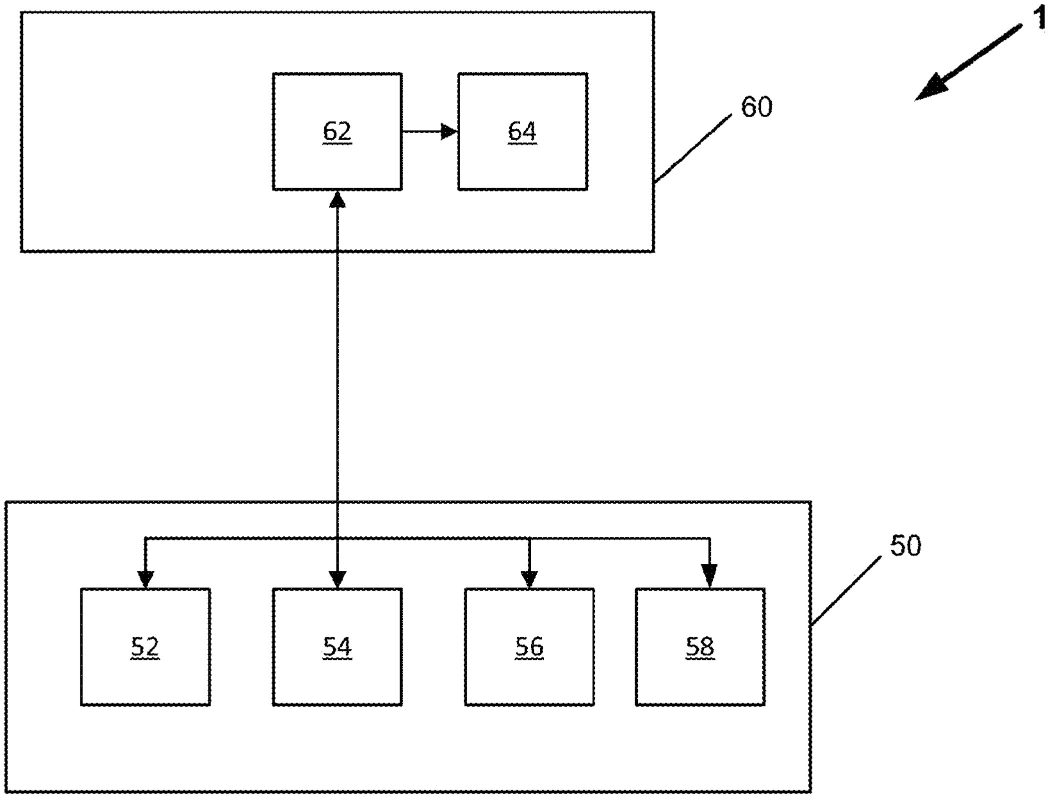
FIG. 1 is a block diagram of the core components of a gaming system.

Referring to the drawings, there is shown an embodiment of an electronic gaming system having an electronic game controller which is operated to implement a game where a symbol evaluation area is expanded if one or more oversized symbol are selected at a position where part of any oversized symbol is outside of the symbol evaluation area in order to encompass the oversized symbol. In an embodiment, the symbol evaluation area is expanded by adding rows and/or columns of symbol display positions to the symbol evaluation area.

In one embodiment, expansion of the symbol evaluation area causes a further selection of symbols to form a modified game outcome. In one example, the reels of a spinning reel game are re-spun with the oversized symbols held in place. In an embodiment, the symbol evaluation area may be further expanded if a further oversized symbol is selected which partially falls outside the symbol evaluation area. The symbols of the expanded symbol evaluation area are evaluated to determine whether to make one or more awards.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system 1 has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
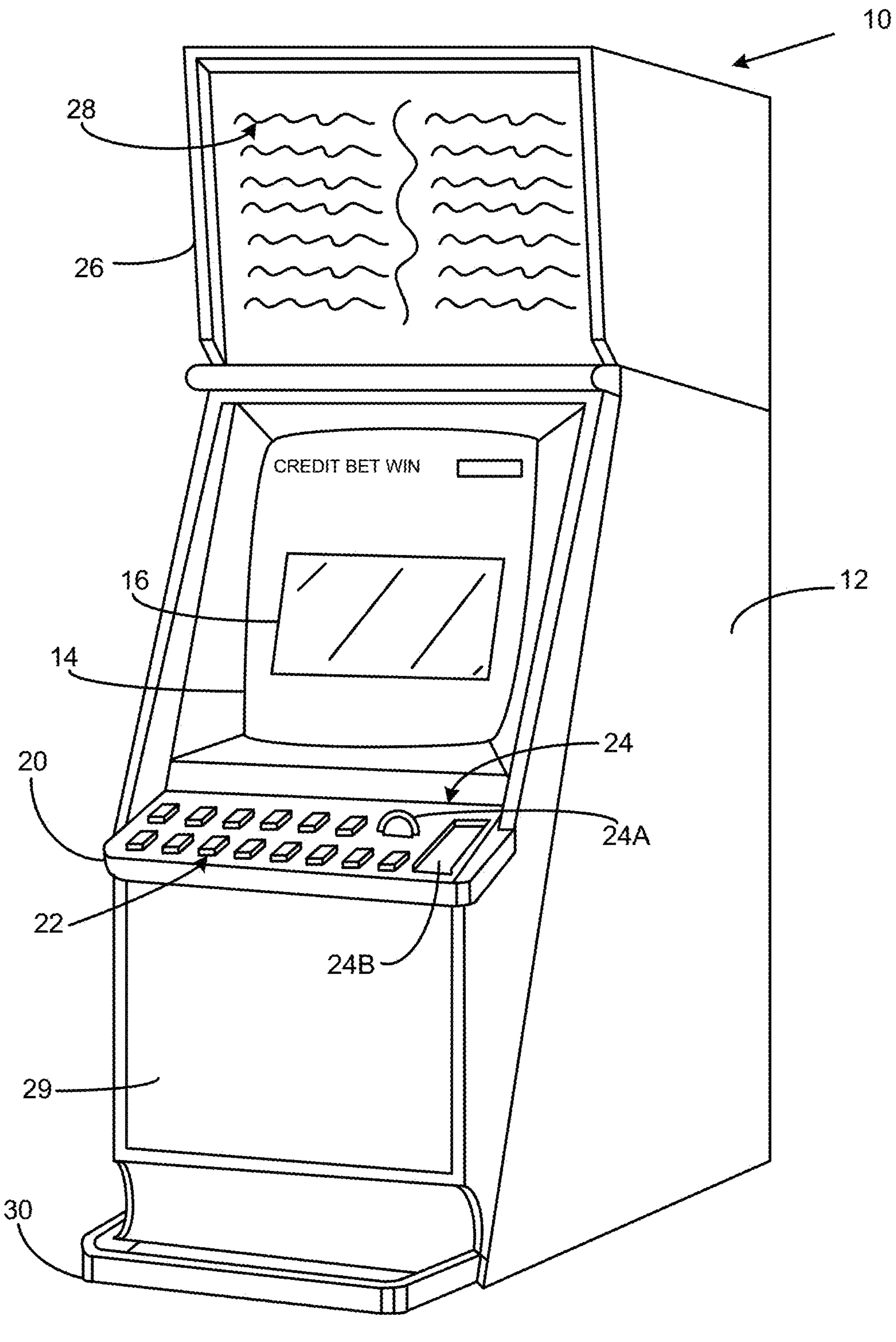
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a liquid crystal display. Alternatively, the display 14 may be a liquid crystal display, plasma screen, any other suitable video display unit. The top box 26 may also include a display, for example a video display unit, which may be of the same type as the display 14, or of a different type.

Figure 3:
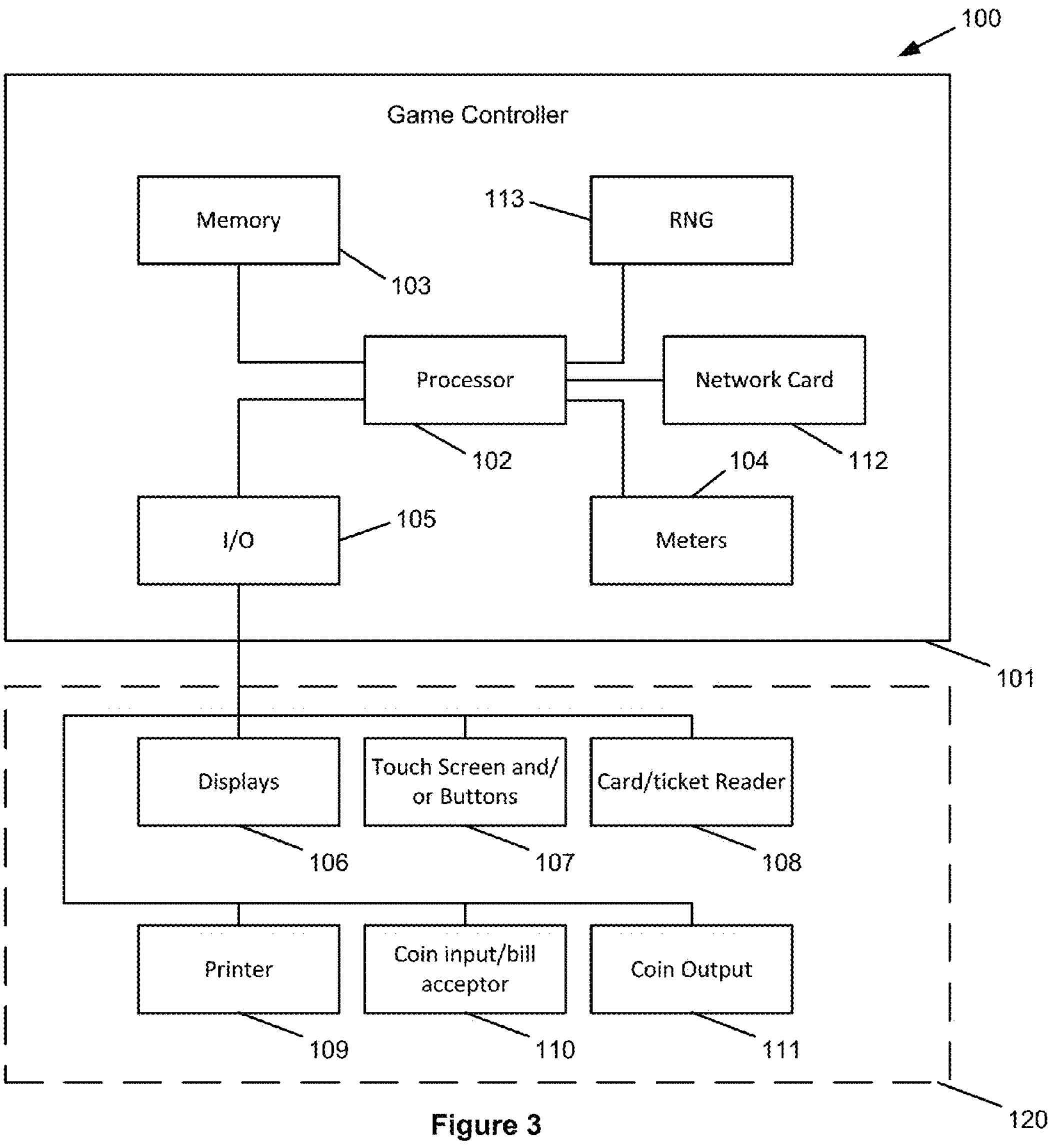
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
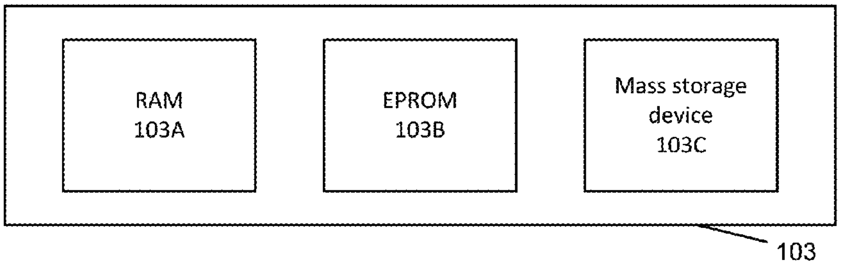
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
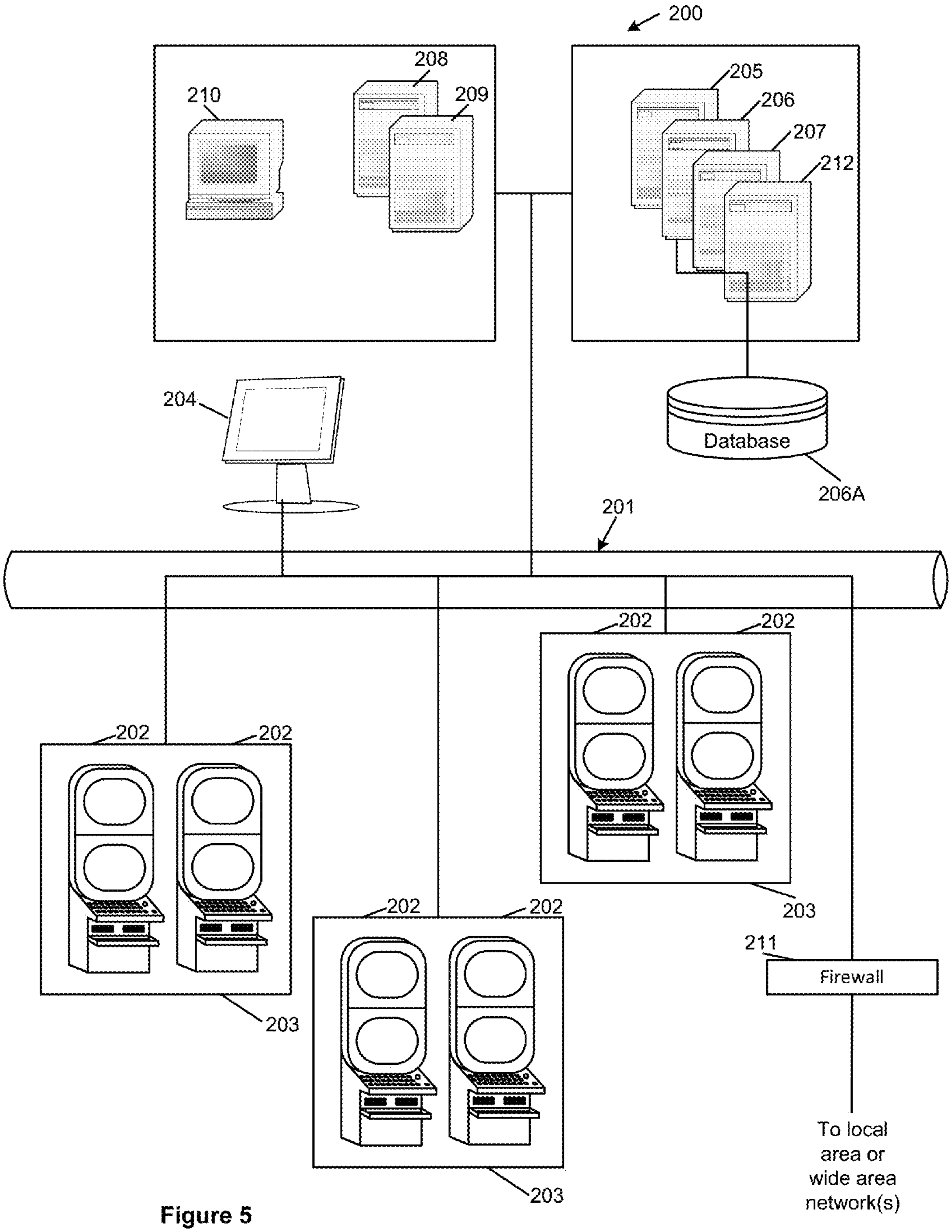
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5 are connected to the network 201. The gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

The player operates the game play mechanism 56 to specify a wager for the game and to initiate a play of the game.

Figure 6:
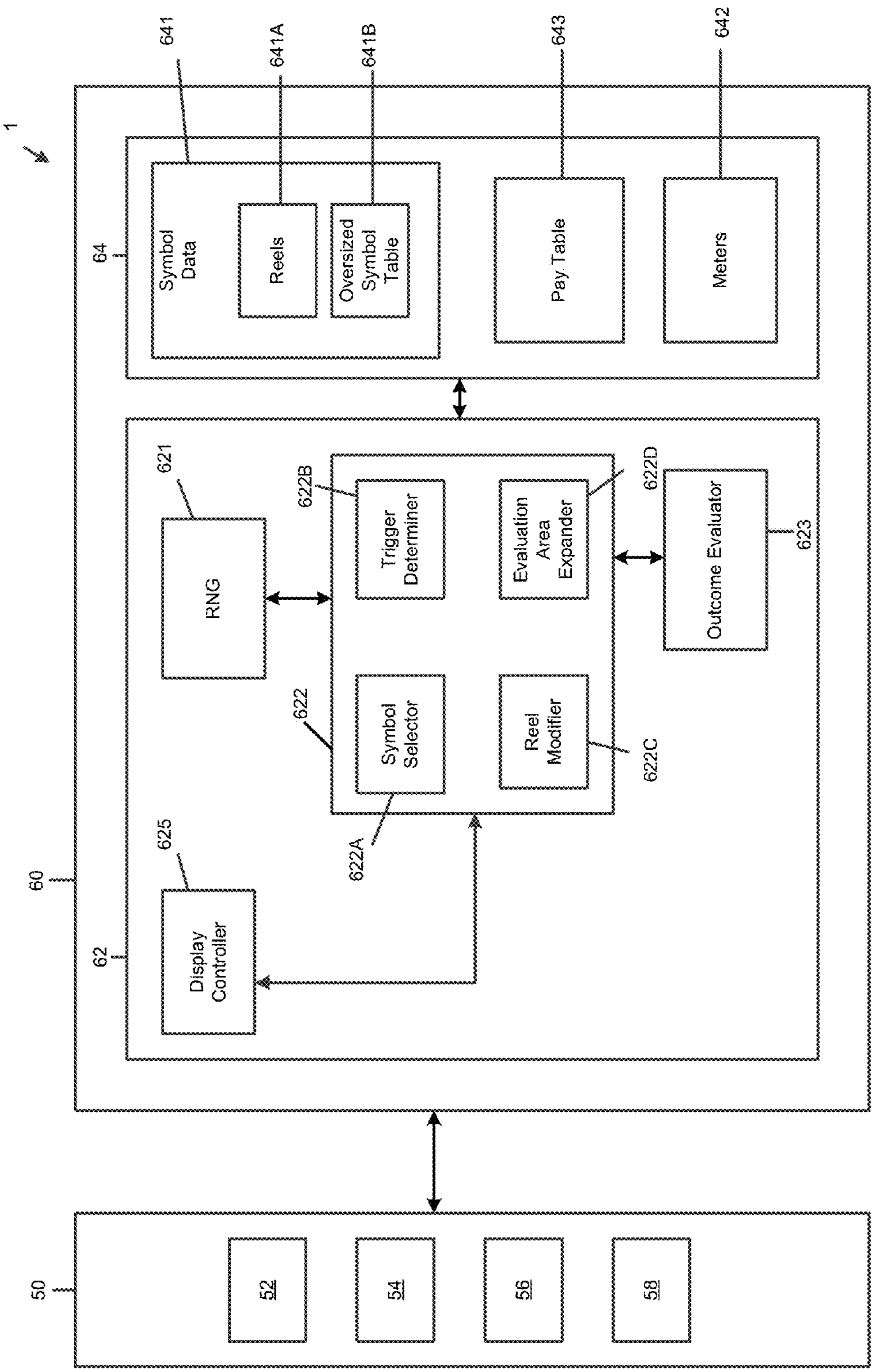
FIG. 6 is a further block diagram of a gaming system.

In FIG. 6, the processor 62 of game controller 60 of gaming system 1 is shown implementing a number of modules based on game program code 641 stored in memory 64. Persons skilled in the art will appreciate that various of the modules could be implemented in some other way, for example by a dedicated circuit.

These modules include display controller 625 which controls the display 54 to display a symbol evaluation area. In an embodiment, the symbol evaluation area is a rectangular array of symbol display positions having a plurality of rows and a plurality of columns. In an embodiment, before the player initiates a play of game, symbols from a previous play of the game are displayed at the display positions.

The outcome generator 622 operates in response to the player's operation of game play mechanism 56 to place a wager and initiate a play of the game and generates a game outcome which will then be evaluated by outcome evaluator 623.

In an embodiment, there are a number of stages to forming a game outcome. The first part of forming the game outcome is for a symbol selector 622A to select symbols from a set of symbols specified by symbol data 641 using random number generator 621 to form an initial game outcome. One example of generating a first game outcome is for the symbol selector 622A to select symbols for display from symbol data 641 in the form of a plurality of symbol sets corresponding to respective ones of a plurality of reels. The symbol sets specify a sequence of symbols for each reel such that the symbol selector 622A can select all of the symbols to be displayed for each reel by selecting a stopping position in the sequence. In one example, three symbols of each of five reels may be selected.

In an embodiment, before the selected symbols are advised to the display controller 625 which will cause them to be displayed on display 54 at the symbol display positions, a determination is made as to whether at least one trigger condition is met. In an embodiment, the determination comprises first the outcome evaluator 623 determining whether the selected symbols of the initial include one or more winning symbol combinations as specified in pay table 643.

Evaluation of the selected symbols is based on the player's wager and depending on the embodiment may include determining whether sufficient symbols are arranged on a pay line selected by the player to match an entry in pay table 643. In another embodiment, the evaluation may be based on reels selected by the player which define a number of ways to win. In another embodiment, the evaluation may be based on numbers of connected symbols.

If the initial outcome includes one or more winning outcomes it is deemed a winning outcome and is displayed on display 54 in the symbol evaluation area, and the evaluation is displayed to the player and the award is added to the win meter maintained in memory 64 as part of meter data 648. The meter data 648 also includes the current value of a credit meter. The current values of the credit and win meters are displayed on display 54 by the display controller 625. Wins are transferred from the win meter to the credit meter at the end of a play of the game. Wagers are deducted from the credit meter when play of a game commences.

If the initial outcome does not include a winning outcome it is deemed a losing outcome and the trigger determiner 622B of outcome generator 622 conducts a random determination to determine whether an alternative outcome is to be presented to the player. For example, by determining whether a random number obtained from the random number generator does or does not correspond to a range of possible outcomes from the random number generator 621 assigned to presenting an alternative outcome.

If an alternative game outcome is not to be presented, the initial outcome is displayed under control of display controller 625 and no awards are made.

If the trigger determiner 622B determines that a trigger condition is met, then in an embodiment the reels are modified by reel modifier 622C to include one or more oversized symbols. Oversized symbols are those which will occupy more than one symbol display position. That is, while the normal symbols occupy a symbol display position, the oversized symbols occupy more than one symbol display position. Accordingly, each oversized symbol may be thought of in terms of its relative size compared to a normal symbol. Each oversized symbol will occupy an array of symbol display positions. An oversized symbol may occupy for example a one by two array, a one by three array, a three by array, a two by one array, a two by two array, a three by three array, etc. The dimensions of the oversized symbols are selected depending on the effects which are desired to be achieved by expansion of the symbol evaluation area.

In the embodiments described below all of the oversized symbols can trigger expansion of the symbol evaluation area depending on where they are positioned. However, in other embodiments, there may be some oversized symbols that do not trigger an expansion of the symbol evaluation area. Accordingly, it will be understood that the normal sized symbols and any oversized symbols that do not trigger are first symbols while oversized symbols which do trigger expansion of the evaluation area if they extend beyond the evaluation area are second symbols.

As indicated above in the embodiments described above, all the second symbols are oversized symbols and all the first symbols are normal size symbols which occupy a single display position, accordingly they are referred to as oversized and normal symbols respectively.

In an embodiment, the reel modifier 622C modifies the reels to be used by the symbol selector 622A to generate a game outcome. In an embodiment the reel modifier controls the placement and number of oversized second symbols the reels 641A based on a weighted oversized symbol table 641B stored as part of symbol data 641. The weighted table 641B specifies a number of possible different numbers and positions of oversized symbols, one option is selected based on a value obtained from random number generator 621 and the reels are modified accordingly. For example, assuming five reels are originally displayed one selectable option may be to add two oversized symbols, to each of the first and fifth reels where five reels are originally displayed, whereas another selectable option may be to add a single oversized symbol to the first reel.

The weighted table may also include possible outcomes corresponding to different sized oversized symbol.

Persons skilled in the art will appreciate that in another embodiment, a single random result obtained from the random number generator 621 can be used to determine whether the random trigger condition is met and select the In such an embodiment, some outcomes defined in the weighted table 641B will correspond to the reels not being modified (and hence the trigger not being met), and some outcomes will correspond to modifications of the reels. In such embodiment, the trigger determiner 622B will in effect be a sub-module of the reel modifier 622C.

As will be described in further detail below, in a typical implementation of spinning reels, reels are only a single symbol wide. Accordingly, where an oversize symbol occupies two or more horizontally adjacent positions, the symbol data 641 specifies which parts of the oversized symbol will fall on the reel and which fall outside the reel. Positions that are outside the reel may overlap an adjacent reel or fall outside the evaluation area. It will also be appreciated that depending on the stopping position of the reel a vertically extending portion of an oversized symbol may fall outside of the symbol evaluation area.

As an alternative to directly modifying the reels, alternative reels could be used. In such an embodiment, the reel modifier 622C modifies the reels by replacing them with alternative reels bearing the oversized symbols.

As a further alternative, the system may use overlay reels to select the position of the overlay symbols. In such an example, the weighted table could determine the number of oversize symbols on the overlay reels, as well as the number and position of oversized reels. In one example, the only symbols on the overlay reels could be oversized symbols with or other spaces in between the oversized symbols being populated by blank symbols. In such an embodiment, when the overlay reel is spun relative to the underlying symbols, the oversize symbol replaces any symbols below it in the display whereas the blank symbols have no effect on the underlying symbol(s).

In a still further embodiment, the placement and number of symbols may be selected randomly without using reels. For example, in a first step a result from the random number generator 621 determine whether to add one or two oversize symbols, and in a second step a further random determination may be used to select a position for those oversize symbols.

Considering now the embodiment where the oversize symbols are added to the reels, after the oversized symbols are added to the reels, the reels are spun and stopping positions are selected for each of the reels by symbol selector 622A using a result obtained from random number generator 621. In the embodiment, the selection of the stopping position of the reels is random, such that the number and position of the oversized symbols on the modified reels are the factors which affect the probability that when stopping positions are selected for being modified reels, one or more modified symbols will either entirely within or partially within the symbol evaluation area. In other embodiments, the selection of the stopping positions may be weighted to increase the probability of an oversized symbol finishing at least partly within the symbol evaluation area, even to the extent of ensuring that at least one oversized symbol will be at least partially within the symbol evaluation area.

In the embodiment when only part of an oversized symbol is within the evaluation area, evaluation area expander 622D modifies the evaluation area by adding as many rows and/or columns as are necessary such that after the rows and/or columns are added, the relevant oversized symbol is displayed within the expanded evaluation area.

In the embodiment, expansion of the evaluation area triggers a re-spin of the modified reels under control of symbol selector 622A. During the re-spin, the oversized symbols are held in position so that they will overlay any symbols selected through the re-spin of the modified reels. New symbols are selected for the other symbol display positions of the expanded evaluation area. That, is in this embodiment, the modified game outcome is a second game outcome derived from the held second symbols and the newly selected symbol for the other symbol display positions of the expanded evaluation area. Depending on the embodiment, this may involve selecting symbols of additional reels. For example as each column corresponds to a reel, if the evaluation area expander 622D expands the evaluation area to include one or more additional columns, then additional reels 641A are spun for those columns. Depending on the embodiment, these additional reels may or may not carry oversized symbols.

In this respect, in some embodiments it may be desirable to place a cap on the extent to which an evaluation area can be expand. In one embodiment, this can be controlled by controlling which reels 641A can be modified to include oversized symbols.

In this respect, in some embodiments, the evaluation area may be able to expand following a re-spin, resulting in one or more further re-spins until either no additional oversized symbols extend outside the evaluation area or until a maximum size is reached.

Once the final game outcome is formed, the outcome is evaluated by outcome evaluator 326 based on pay table 643 to determine whether to make an award. In this respect, the manner in which the game outcome is determined may depend on the number of symbols that have been added to the evaluation area. For example, in the case of evaluations based on paylines, expanding the evaluation area may result in the addition of additional paylines which need to be evaluated. Such paylines are typically formed by a combination of symbol display positions, one from each reel, the symbol display positions being located relative to one another such that they form a line.

Alternatively, the manner in which the game outcome is evaluated may not be affected by changes to the evaluation area. For example, game outcomes may be evaluated to find groups of connected symbols and prize awards may depend on the number of connected symbols. That is, symbols that share a common border may be considered connected symbols.

Figure 7:
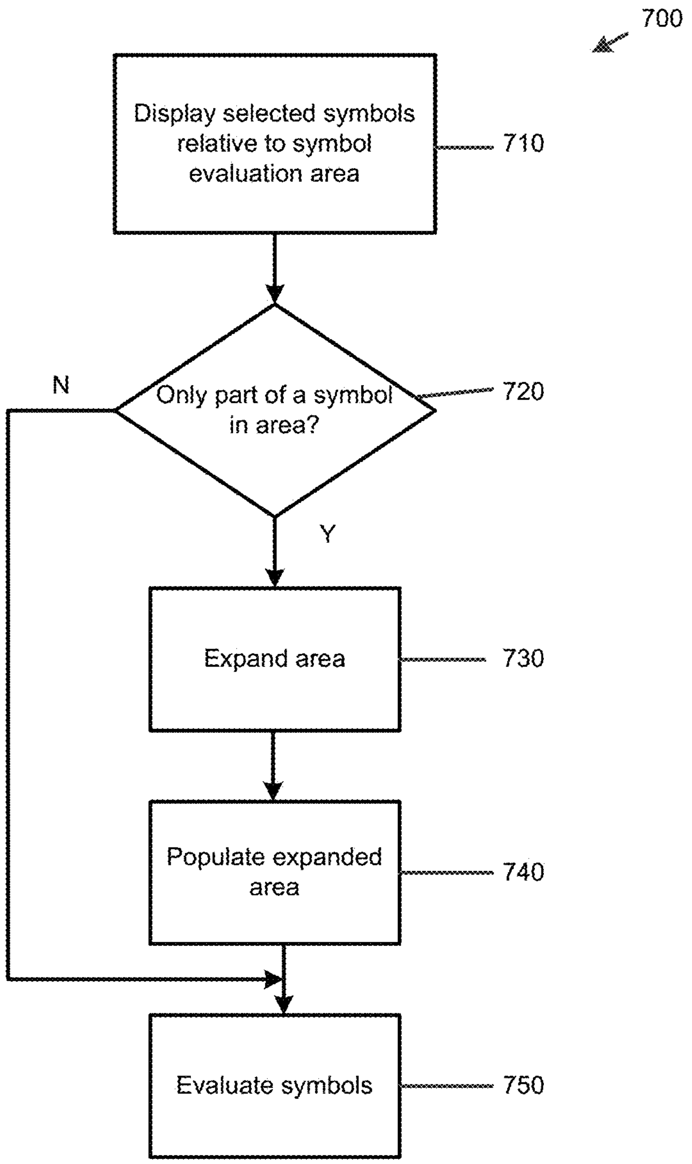
FIG. 7 is a flow chart of an embodiment.

Referring now to FIG. 7 there is illustrated a method in an embodiment. The method 700 involves displaying selected symbols relative to a symbol evaluation area 720 determining whether only part of a second symbol is in the evaluation area 720. If all symbols are contained with evaluation area, the method proceeds directly to displaying an evaluation of the symbols 750. Alternatively if only part of a second symbol is in the area, the method involves expanding the symbol evaluation area 730, populating the expanded area 740 with additional symbols, and then evaluating the symbols 750.

Persons skilled in the art will appreciate that a number of variations may be made to the invention. For example, in one embodiment, the symbol evaluation area may be displayed initially with an area around it greyed out and once an oversize symbol is selected, it will reveal previously hidden symbols.

It will be appreciated that embodiments of the invention provide arrangements where the symbol evaluation area grows vertically and/or horizontally in order to encompass the entire oversize symbol. Thus, in the embodiment, the area can grow in any of the four cardinal directions for example horizontally to the left or right, or up and down. In other embodiments, growth may only occur horizontally or vertically, or in a specific direction (e.g. upwards). In embodiments, where the reel area grows horizontally additional reels are added which result in the possibility that larger numbers of symbols may be included in a winning combination where the winning combination is evaluated based on a player selection of reels or paylines. In embodiments, where the evaluation area grows vertically up or down, the vertical growth enhances pays by increasing the number of coinciding wins.

In other embodiments, the sizes of the oversized symbols added to the reels may vary depending on the number of times the reels have been re-spun.

In other embodiments, when the first symbols are re-spun, the symbols on the reels could be changed in order to increase the possibility of a match with the second symbols.

Figure 10:
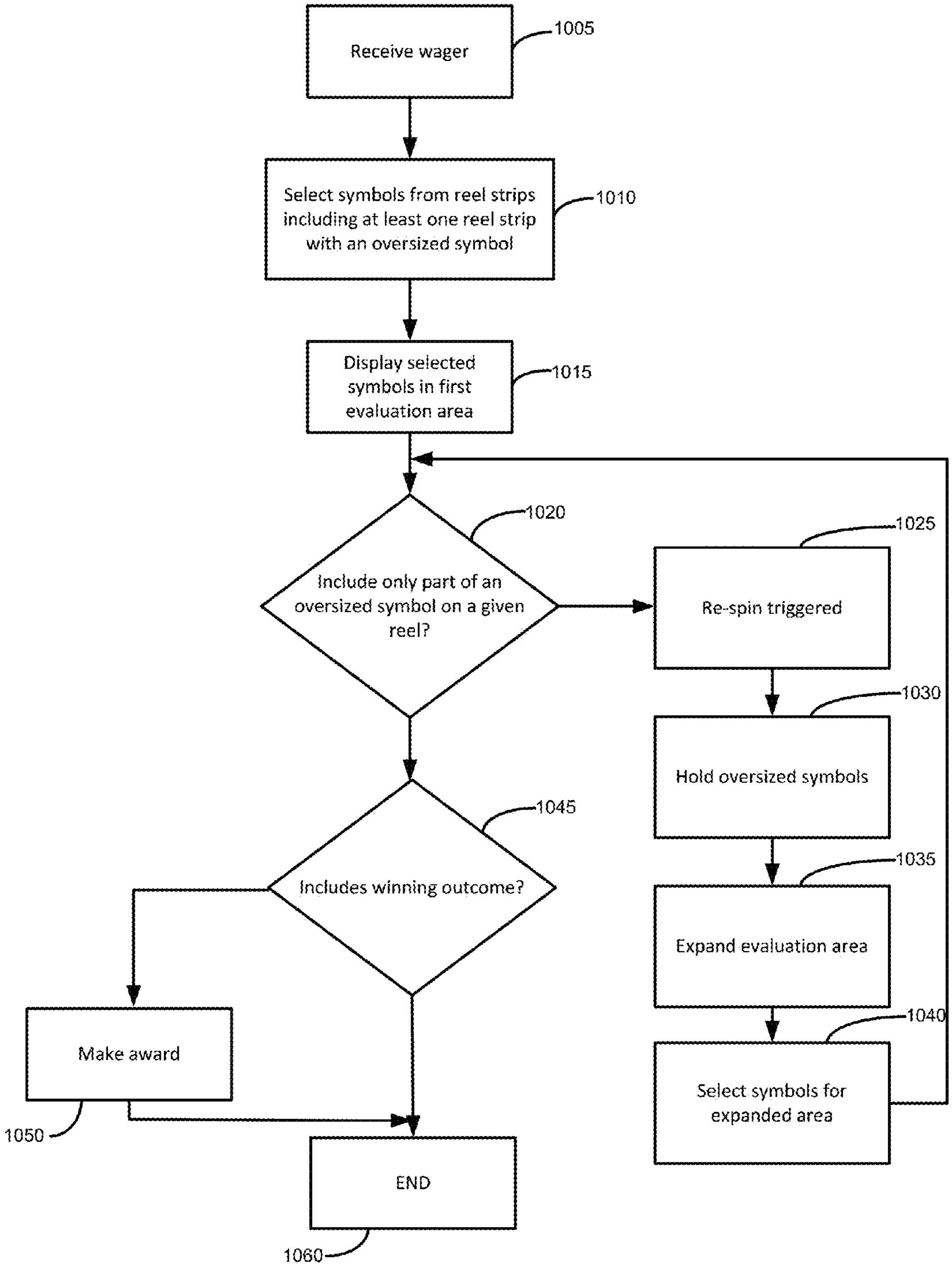
FIG. 10 is a flow chart of another embodiment.

Referring to FIG. 10, there is shown a specific embodiment where the oversized symbols correspond to individual reel strips. Accordingly, in this embodiment, the reel strip data 641A stored in memory 64 defines the reel strips of respective ones of a plurality of reels. For example, five reels. In this example, at least one of the reel strips has at least one oversized symbol that occupies two or more symbol display positions of a column of symbol display positions when displayed. That is, each of the oversized symbols of this embodiment is only one symbol display position wide but is multiple symbol display positions high. As a result, in certain stopping positions of the respective reel strip only part of the oversized symbol of a particular reel will be displayed.

Referring to FIG. 10, in step 1005, the gaming system 1 receives a wager and the instructions to initiate a play of the game via the game play mechanism 56. At step 1010, the symbol selector 622A of outcome generator 622 selects symbols from the reel strips 641A by selecting stopping positions using values obtained from random number generator 621. At step 1015, the display controller 625 controls the display to display the selected symbols in a first evaluation area. In some embodiments, the display displays the evaluation area by indicating that it is active and that there are other display positions which could be added which are inactive. For example, the active evaluation area may be lit while the inactive part of the evaluation area may be greyed-out. In some embodiments, if only part of an oversized symbol is selected to fall within the active evaluation area, the part falling outside the active evaluation area may be highlighted.

At step 1020, the evaluation area expander 622D of the outcome generator 622 determines whether the selected symbols include only part of an oversized symbol on any one of the given reels. That is, whether part of an oversized symbol of one of more of the reels fall outside of the evaluation area. In some embodiments, only oversized symbols having a part that falls outsider the top of the evaluation area are treated as falling outside the evaluation area. In an example, if part of an oversized symbol falls outside of the evaluation area, a re-spin feature is triggered 1025. In this example, the outcome generator 622 is arranged to hold 1030 the oversized symbols in position. At step 1035, the evaluation area expander 622D expands the evaluation area 1035. At step 1040, the symbol selector 622A selects symbols for the expanded symbol evaluation area. In this example, the method then reverts to step 1020 of determining whether the symbols that are selected include only part of an oversized symbol. Accordingly, in this example, steps 1025, 1030, 1035 and 1040 will be repeated until all oversized symbols fall within the evaluation area. In other embodiments, the step of conducting a re-spin with the held oversized symbol may only be performed once or only be performed until the evaluation area grows to a defined size.

At step 1045, it is determined whether the selected symbols include one or more winning outcomes. If a winning outcome is included, an award is made by the outcome evaluator 623 based on the values stored in pay table 643 and the award is added to the win meter of meters 642. At step 1060, the game ends.

In some embodiments, an eligibility criteria may be applied in order for the player to be eligible for the evaluation area to be expanded, for example that the player has made a certain sized wager, made an ante bet, selected all win lines, played sufficient games, or the player is a member of a loyalty program.

In other embodiments, the trigger event may be a symbol combination in the game, occurrence of a specific symbol in the game, purchased, be caused by another connected system, be based on turnover, etc. In an embodiment, the trigger conditions may not include that the initial outcome is a losing outcome. In such embodiments, it could be determined whether the trigger condition is met at a different time, for example before any symbols are selected such that it is not necessary to generate an initial outcome.

As described above, a winning game outcome will result in some form of award being made such as an award of credits. An award of credits may never actually be physically received by a player. For example, many gaming systems provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

In other embodiments, the player may select a number of reels to play and an amount to wager per reel. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. In an embodiment, the player may be entitled to wins for all symbol display positions of each added reel. In an embodiment, the player may be required to play all reels to be eligible for expansion of the symbol evaluation area.

EXAMPLES

Example 1

Figure 8A:
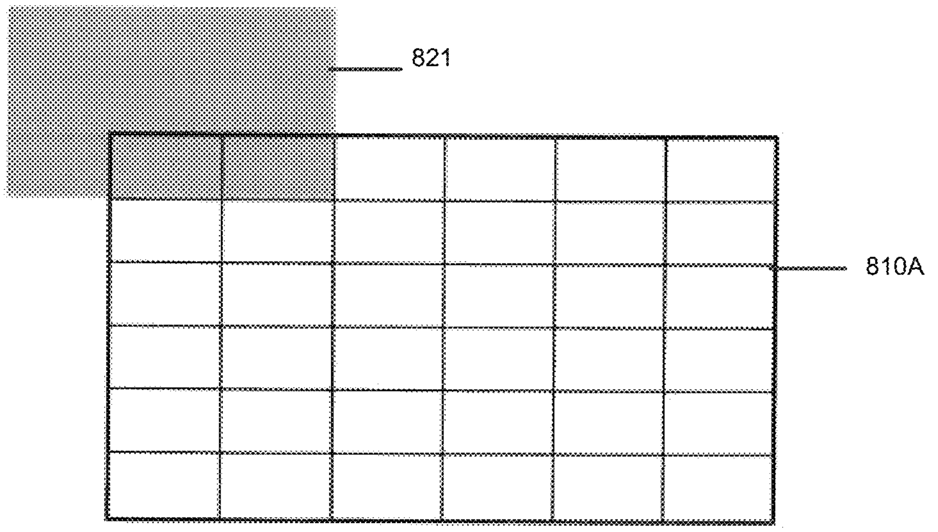
FIGS. 8A and 8B show a first example of an expanding symbol evaluation area.

Referring to FIG. 8, FIG. 8A shows an initial symbol evaluation area 810A comprising 36 symbol display positions arranged in a rectangular array of six columns and six rows. An oversized symbol has been selected and has landed in the upper left corner with part of the oversized symbol 821 occupying the top position of each of the first and second reels (the two left most reels). In this example the oversized symbol is a three by three symbol.

Figure 8B:
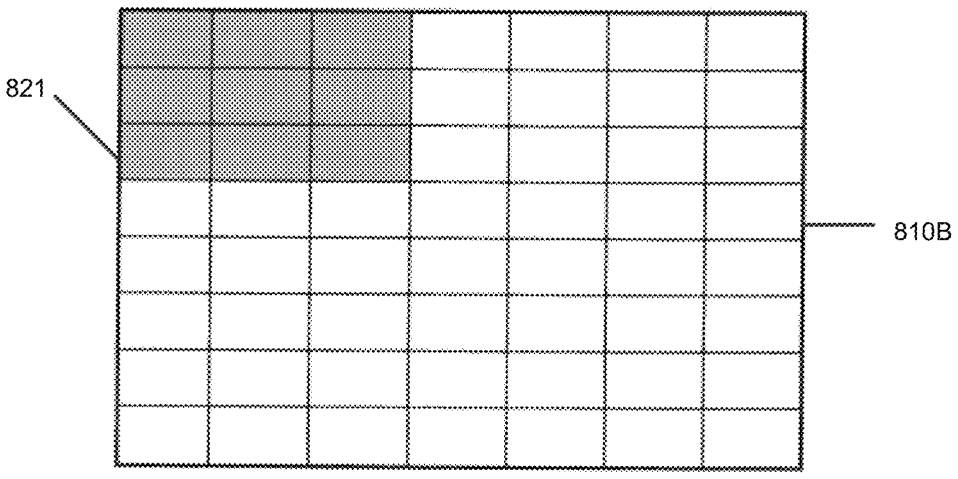

The landing of the symbol results in the addition of one column and two rows to the symbol evaluation area as shown in FIG. 8B. That is, symbol evaluation area has expanded in order to encompass the oversize symbol 821 within the boundaries of the symbol evaluation area 810B.

Example 2

Figure 9A:
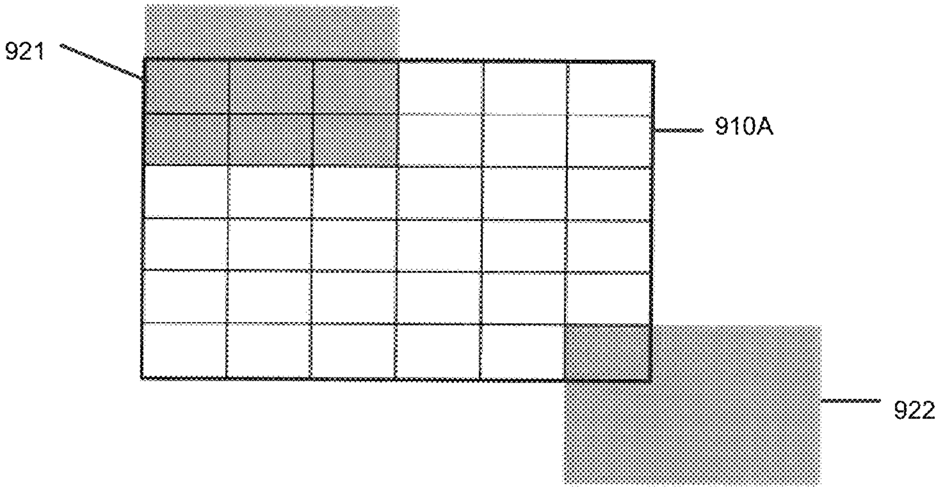
FIGS. 9A and 9B show a second example of an expanding symbol evaluation area.
Figure 9B:
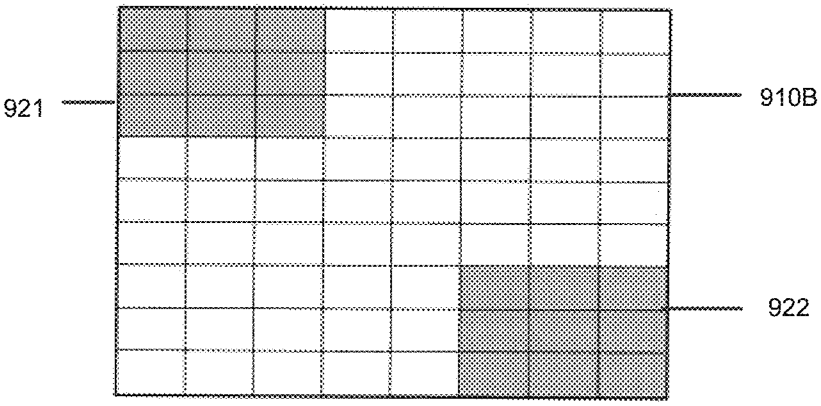

FIG. 9 shows a second example where two oversized symbols are selected. In this embodiment, the initial symbol evaluation area 910A is a six by six array of rows and columns. Again, in this embodiment the oversized symbols are three by three symbols. A first oversized symbol 921 is selected to be positioned such that it has six of its nine symbol display positions within the symbol evaluation area with three extending above the first three reels. The second oversized symbol 922 is selected such that only a part of it occupies the bottom most position on the right most reel. In this example the evaluation area grows upwards to encompass all of the first oversized symbol 921 and down and to the right in order to encompass all of the second oversized symbol 922 to form a modified symbol evaluation area 910B.

As described above, symbols are then selected for each of the positions not occupied by the oversized symbol and the outcome is evaluated in order to determine whether to make an award to the player.

Example 3

The electronic method of operating a gaming system of embodiments of the invention includes the implementation of the following example game.

In an example, a player can win a linked progressive jackpot which may be a single site progressive jackpot or a multi-site progressive jackpot.

On gaming machines implementing the game, all wins are shown in credits, except progressive jackpots. All wins are wins shown with the bet multiplier 1, however the player can choose a bet multiplier. In the example, the player cannot chose how many pay lines to play. In one example, a minimum bet of 75 credits for 100 lines.

While the reels are spinning the player may press a designated button to stop them except when disabled such as during the "Wild Horde" and "Re-spin Bonus" described below.

All winning outcomes must be on lit lines except scatters. Wins on different lines are added, however, only the highest win on each line is counted. Scatter wins are added to line wins. The bet multiplier during a bonus feature is the same as the game that triggered the bonus feature. All winning outcomes are begin with the leftmost reel and pay left to right on adjacent reels, except scatters.

A "WILD" symbol substitutes for all symbols except scatters. A scatter symbol "SCAT" pays in any position.

Miniature Progressive Meters are displayed at the highest point of the screen at least during the Free Games feature, Re-spin Bonus feature, and Wild Horde feature described below.

Whenever "Fly By" is triggered, oversized symbols referred to in this example as "Big Symbols" will be added to reels.

If Fly By is triggered, the length of time it takes for the first reel to stop is extended. During Fly By, dynamic stacks reflect a selected feature Big Symbol, the featured symbol will be highlighted as the reels spin. That is, there is a group or stack of symbols on the reel that can be changed (and hence is dynamic). The reels stop from left to right as normal. Forced reel stop by the designated button is disabled.

Pay any wins.

More specifically, for all bought games except the Fly By and Re-spin Bonus DYN1, DYN2, DYN3, DYN4, and DYN5 symbol positions within the reel strips are replaced with PIC1, PIC2, PIC3, PIC4, or PIC5 respectively.

There are dynamic positions on all reel strips. The game controller determines what symbols are in the dynamic positions on button press (i.e. when the game initiates), via weighting tables. In the Re-spin Bonus described in further detail below, the game controller will additionally replace the scatter symbol. The functionality of replacement is the same as for base game and free games.

The Re-spin Bonus Feature triggers when part of an oversized symbol referred to as a "BIG SYMBOL" occurs in the symbol evaluation area (reel area). In the example, Wins are evaluated prior to feature. After the wins are evaluated, a re-spin is awarded. When only part of the Big Symbol is visible, the symbol evaluation area will grow during the re-spin. The reels increase in height until the top and bottom symbol positions of the triggering Big Symbol are shown. With each height increase, pay lines are added to the game by the evaluation area expander 622D. Re-spins continue until a Big Symbol does not land on the screen. All wins are evaluated following each spin.

Symbol selection, placement, and growth of the array are all determined by weighting tables. In one example, the Big Symbol may appear in the base game such that it will not cause the reel area to grow.

Similarly to "Fly By", if the Re-spin Bonus feature is triggered, the length of time it takes for the first reel to stop is extended; dynamic stacks reflect selected feature Big Symbol, the featured symbol will be highlighted as the reels spin, message line reads: "Bonus Reels in Play". The reels stop from left to right as normal. Forced reel stop is disabled.

As the Big Symbol lands, the symbol flashes accompanied with an audio cue. If the Big Symbol is not within the current evaluation symbol display positions (in this example the visible part of the stopped reels), an out of bounds trigger highlight flashes to represent the symbol outside of the reel area. The outcome evaluator 623 evaluates the selected symbols based on the pay table 643 and pays any wins.

The display controller controls the display to display a message line shown once all reels have stopped with the message "RE-SPIN WON!"

A reel frame surrounding the rectangular array of symbol display positions is displayed as shattering and the reels start to re-spin while the reels areas is shown as growing.

If, on the other hand, the Big Symbol lands completely in the reel area, there is no growth and the reel frame does not shatter.

Re-spin Bonus background music replaces base music as jackpot bell is played.

During the re-spin feature, Forced reel stop is disabled. A Message line is displayed as the reels spin: "Bonus reels in play—RE-SPIN X"

Where x starts at 1 and increments on subsequent re-spins. As described above, the reels re-spin and grow to include the entire big symbol. In this respect, in an example, all big symbols are "sticky" and remain on screen for subsequent re-spins until the feature completes. This, in part, provides a reference to enable the growth of the reels to be observed. In an example, re-spins continue until no new big symbol lands or until the evaluation area reaches a maximum size. In one example, when the evaluation area reaches maximum size there are 300 win lines compared to the initial 100 win lines.

In an embodiment, the game controller also provides a "Michonne Slash" feature. In this example, a triggering game must have less than 3 scatters visible. Provided this condition is met, a random determination may result in a "Michonne" character randomly entering the display 54 after the reels stop. Michonne is displayed as slashing at the reels resulting in the change of all PIC category symbols to the same PIC symbol. In some cases the Michonne character is accompanied by her "pet walkers". When her pets walk across the screen, they reveal a random feature multiplier that modifies the win.

"Wild Horde" is another randomly triggered game element. The triggering game must be a winning game with less than 3 scatters. Wild Horde enters and reveals wild reels. The number of wild reels added is based on thresholds.

During Wild Horde, forced reel stop is disabled. Wild Horde reveals a random amount of wild reels. If a feature threshold is not met, additional wild reels will randomly be placed until feature threshold has been met.

A further game aspect, is the "Governor's Jackpot Bonus". The triggering game must have 3 or more scatters visible.

After triggering Governor's Jackpot Bonus, the game will transition into the "Pick'em". The display is controlled to display "heads" in "tanks" and the player will be prompted to pick heads until matching three jackpot symbols to win that jackpot.

On player input, the picked tank will be displayed as shattering with the water rushing out. After three picks the heads in the tanks will change from their idle, "less agitated state," to their "more agitated state." After the player reveals a match, the final prize will pulse and added. Players are awarded progressive jackpots if they select three matching jackpot symbols. Tanks may also reveal a multiplier. Only one multiplier is available per jackpot level.

The Progressives jackpots that are available are:

GRAND (only available at a maximum wager)

MAJOR

MINOR

MINI

The "Free games" feature is triggered by 3 or more FREE GAME scatters OR at the end of the Governor Jackpot Bonus pick' em.

The display changes to show "5 TANKS" and the player is instructed to "Touch a TANK of your choice to reveal your number of free games."

On player input, the picked tank will shatter to reveal: 8, 10, 12 or 15 FREE GAMES OR PICK AGAIN X2 which doubles the total free games won on next pick.

During Free games, "HEAD" symbols remain on screen when they land and remain in place for the duration of the feature. Growth of the symbol array can be triggered throughout free games by collecting "HEAD" symbols. In the free game feature "SCAT" symbols are replaced with "FREE GAME TRIGGER" symbols and will grant additional free games for 3 or more symbols.

Accordingly, it will be appreciated that there are, in effect, two different types of scatters, FREE GAMES scatter and JACKPOT BONUS scatter.

During free games, the display shows a message: "FREE GAME X OF Y" In this message X is the current free game starting at 1, and Y is the total number of free games starting at the number that triggered the feature. In the free games forced reel stop is enabled.

In the example, during the free games feature bonus reels are in play with the addition of a WILD "GOVERNOR" symbol.

"GOVERNOR" triggers reel growth when occurring in both the playable and non-playable area above the current playable (evaluation) area (i.e. not when below the current playable area). That is the GOVERNOR symbol causes the evaluation area to expand upwards. The Reel height is extended until the top of the GOVERNOR symbol is included in the playable area. During growth, animation of the following reel spin will be extended until growth is complete. The Reel height returns to five symbol display positions high after the game win is evaluated.

Additional lines are in play for each position of reel growth. During the free game, "SCAT" symbols will be replaced with "FREE GAME" symbols and will grant additional free games for three or more symbols.

In an example, the PIC1, PIC2, PIC3, PIC4 or PIC5 symbols may have the dimensions set out in Table 1 during a Fly By and Re-spin Bonus Feature trigger:

TABLE 1

| BIG | DIMENSION | |
|---|---|---|
| SYMBOL # | Reels | Height |
| 1 | 2 | 3 |
| 2 | 2 | 3 |
| 3 | 3 | 4 |
| 4 | 3 | 4 |
| 5 | 3 | 4 |
| 6 | 4 | 5 |

Big symbols are counted for all positions they cover.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An electronic method of operating a gaming system comprising a display, a credit input mechanism, and a game controller, the method comprising:

establishing a credit balance associated with a player based on a credit input received via the credit input mechanism, the credit input mechanism comprising at least one of a coin input chute, a bill collector, a card reader, and a ticket reader;

receiving a wager from the player for play of a game, wherein the wager decreases the credit balance;

displaying a symbol evaluation area on a display of a gaming system, the symbol evaluation area comprising a plurality of rows and a plurality of columns of symbol display positions;

in response to the wager, generating, using the game controller, a game outcome by selecting a plurality of symbols to populate the symbol display area, the symbols being selected from first symbols having a size corresponding to the size of the symbol display positions and one or more second symbols, wherein each second symbol is at least the size of two display positions, the selecting of the symbols including selecting a display position of the evaluation area at which each selected first symbol will be displayed, and selecting one or more symbol display positions of the evaluation area at which part of each selected second symbol will be displayed such that depending on one or more symbol display positions selected for a respective second symbol, only a part of the respective selected second symbol may be within the symbol evaluation area;

upon only part of one or more selected second symbols being within the symbol evaluation area, expanding, using the game controller, the symbol evaluation area displayed on the display of the gaming system by adding one or more rows of symbol display positions, one or more columns of symbol display positions, or one or more rows and one or more columns of symbol display positions so that all of each selected second symbol is within the expanded symbol evaluation area;

generating, using the game controller, a modified game outcome including symbols at each symbol display position of the expanded symbol evaluation area; and increasing the credit balance by an award in response to the symbols of the modified game outcome corresponding to one or more winning outcomes.

2. A method as claimed in claim 1, comprising further expanding the symbol evaluation area using the game controller upon only part of one or more second symbols included in the modified game outcome being within the expanded symbol evaluation area, and generating a further modified game outcome including symbols at each symbol display position within the further expanded symbol evaluation area.

3. A method as claimed in claim 1, comprising evaluating at least one of the game outcome and the modified game outcome to determine whether to make an award.

4. A method as claimed in claim 1, comprising displaying any portion of a second symbol extending outside the symbol evaluation area on the display of the gaming system.

5. A method as claimed in claim 1, wherein generating the modified game outcome comprises retaining, using the game controller, each second symbol and selecting new symbols for remaining symbol display positions of the symbol evaluation area.

6. A method as claimed in claim 1, wherein generating the modified game outcome comprises selecting symbols, using the game controller, for each additional symbol display position added to the symbol evaluation area in response to expansion of the symbol display area.

7. A method as claimed in claim 1, comprising generating an initial game outcome by selecting a plurality of symbols from a symbol set comprising only first symbols having a size corresponding to the size of the symbol display positions, and upon at least one trigger condition being met replacing the initial game outcome with the game outcome generated by selecting a plurality of symbols from a symbol set comprising first symbols having a size corresponding to the size of the symbol display positions and one or more second symbols, wherein each second symbol is at least the size of two display positions.

8. A method as claimed in claim 7, wherein at least one trigger condition includes that the initial game outcome is a losing game outcome.

9. A method as claimed in claim 7, wherein the at least one trigger condition includes that a random determination meets a defined criterion.

10. A method as claimed in claim 7, wherein the initial game outcome is not displayed upon the at least one trigger condition being met.

11. A method as claimed in claim 7, wherein the initial game outcome is displayed upon the at least one trigger condition not being met.

12. A method as claimed in claim 1, wherein the first symbols belong to respective ones a plurality of reels of symbols each corresponding to a column of the symbol evaluation area, and selecting the symbols includes determining a stop position for each of the reels.

13. A method as claimed in claim 12, wherein each second symbol belongs to a respective one of the plurality of reels.

14. A method as claimed in claim 12, wherein each second symbol is added to a respective one of the plurality of reels.

15. A method as claimed in claim 12, wherein each second symbol belongs to an overlay reel, a stopping position for each overlay reel is selected independently of the stopping positions of each reel having first symbols, and when a stopping position of an overlay reel results in at least part of a second symbol being displayed within the symbol evaluation area, the at least part of the second symbol replaces each first symbol at the symbol display position or positions where the second symbol is displayed.

16. An electronic method of operating a gaming system comprising a display, a credit input mechanism, a game controller, and a memory storing a plurality of reel strips of respective ones of a plurality of reels, at least one of the reel strips comprising at least one oversized symbol that is large enough to occupy two or more symbol display positions of a column of symbol display positions whereby in certain stopping positions of the respective reel strip only part of the oversized symbol will be displayed, the method comprising:

establishing a credit balance associated with a player based on a credit input received via the credit input mechanism, the credit input mechanism comprising at least one of a coin input chute, a bill collector, a card reader, and a ticket reader;

receiving a wager from the player for play of a game, wherein the wager decreases the credit balance;

in response to the wager, selecting, using the game controller, symbols for a first evaluation area of symbol display positions comprising a plurality of columns of symbol display positions set side by side by selecting first stopping positions for each of the reel strips;

displaying the selected symbols in the first evaluation area of symbol display positions;

upon the displayed symbols including only part of one or more oversized symbols, forming a second, expanded evaluation area of symbol display positions by adding sufficient rows of symbol display positions to the first evaluation area to accommodate all of each of the oversized symbols;

selecting symbols for the second evaluation area by selecting second stopping positions for each of the reel strips; and making an award to the credit balance in response to the symbols selected for the second evaluation area corresponding to one or more winning outcomes.

17. A method as claimed in claim 16, comprising retaining, using the game controller, each oversized symbol selected for the first evaluation area at the symbol display positions the respective oversized symbol occupies in the second evaluation area when symbols are selected for the second evaluation area.

18. A method as claimed in claim 16, comprising upon the displayed symbols of the second evaluation area including only part of one or more further oversized symbols, forming, using the game controller, a third evaluation area of symbol display positions by adding sufficient rows of symbol display positions to the second evaluation area to accommodate all of each of the oversized symbols.

19. A method as claimed in claim 16, comprising selecting, using the game controller, a further set of symbols each time part or all of an oversized symbol is selected.

20. A gaming system comprising:

a credit input mechanism configured to receive a credit input from a player, the credit input mechanism comprising at least one of a coin input chute, a bill collector, a card reader, and a ticket reader;

a display; and a game controller configured to:

establish a credit balance associated with the player based on the received credit input;

receive a wager from the player for play of a game, wherein the wager decreases the credit balance;

control the display to display a symbol evaluation area, the symbol evaluation area comprising a plurality of rows and a plurality of columns of symbol display positions;

in response to the wager, generate a game outcome by selecting a plurality of symbols to populate the symbol display area, the symbols being selected from first symbols having a size corresponding to the size of the symbol display positions and one or more second symbols, wherein each second symbol is at least the size of two display positions, the selecting of the symbols including selecting a display position of the evaluation area at which each selected first symbol will be displayed, and selecting one or more symbol display positions of the evaluation area at which part of each selected second symbol will be displayed such that depending on the one or more symbol display positions selected for a respective second symbol, only a part of the respective selected second symbol may be within the symbol evaluation area;

upon only part of one or more selected second symbols being within the symbol evaluation area, expand the symbol evaluation area displayed on the display by adding one or more rows of symbol display positions, one or more columns of symbol display positions, or one or more rows and one or more columns of symbol display positions so that all of each selected second symbol is within the expanded symbol evaluation area;

generate a modified game outcome including symbols at each symbol display position of the expanded symbol evaluation area; and increase the credit balance by an award in response to the symbols of the modified game outcome corresponding to one or more winning outcomes.

* * * * *